United States Patent
Nummela et al.

(10) Patent No.: US 9,676,503 B2
(45) Date of Patent: Jun. 13, 2017

(54) SEALING APPARATUS HAVING A PLURALITY OF SEALING ELEMENTS ARRANGED AROUND A CENTER OPENING INTO A RING CONFIGURATION

(71) Applicant: NEXTROM OY, Vantaa (FI)

(72) Inventors: Jukka Nummela, Kirkkonummi (FI); Risto Widerholm, Espoo (FI); Tatu Kutvonen, Leppavirta (FI)

(73) Assignee: NEXTROM OY, Vantaa (FI)

(*) Notice: Subject to any disclaimer, the term of this patent is extended or adjusted under 35 U.S.C. 154(b) by 749 days.

(21) Appl. No.: 13/891,462

(22) Filed: May 10, 2013

(65) Prior Publication Data
US 2013/0298501 A1   Nov. 14, 2013

(30) Foreign Application Priority Data
May 14, 2012 (FI) .................... 20125510

(51) Int. Cl.
 C03B 37/029 (2006.01)
 B65B 7/00 (2006.01)
(52) U.S. Cl.
 CPC ............. B65B 7/00 (2013.01); C03B 37/029 (2013.01); C03B 2205/80 (2013.01); C03B 2205/81 (2013.01)
(58) Field of Classification Search
 USPC .......... 65/483; 277/349, 364, 387, 422, 602, 277/603, 607
 See application file for complete search history.

(56) References Cited

U.S. PATENT DOCUMENTS

| | | | | |
|---|---|---|---|---|
| 3,860,270 A | * | 1/1975 | Arnold ................... | F16L 17/10 277/605 |
| 6,257,628 B1 | * | 7/2001 | Nijsen .................... | F16L 21/04 285/322 |
| 2002/0078714 A1 | | 6/2002 | Bird et al. | |
| 2006/0280578 A1 | * | 12/2006 | Shiono ......................... | 411/542 |

FOREIGN PATENT DOCUMENTS

| | | |
|---|---|---|
| DE | 39 03 466 A1 | 8/1990 |
| EP | 2 022 766 A2 | 2/2009 |
| EP | 2 218 693 A2 | 8/2010 |

(Continued)

OTHER PUBLICATIONS

Machine translation of WO 2012/033158 A1. Original Publication Mar. 15, 2012.*

(Continued)

Primary Examiner — Cynthia Szewczyk
(74) Attorney, Agent, or Firm — Oliff PLC

(57) ABSTRACT

The invention relates to an apparatus. In order to achieve efficient sealing, the apparatus includes a sealing with a plurality of sealing elements arranged generally in a ring configuration around a center opening. Each sealing element includes a sealing surface facing the center opening. At least one chamber is included for receiving sections of the sealing elements. An inlet to a fluid source provides the at least one chamber with fluid in order to generate an overpressure acting on the sections of the sealing elements received in the at least one chamber, and for pressing and moving the sealing surfaces of the sealing elements towards the center opening.

14 Claims, 3 Drawing Sheets

(56) References Cited

FOREIGN PATENT DOCUMENTS

| | | |
|---|---|---|
| JP | A-6-56458 | 3/1994 |
| JP | A-8-253337 | 10/1996 |
| JP | A-10-167751 | 6/1998 |
| JP | 2004-161545 A | 6/2004 |
| JP | 2012-056815 A | 3/2012 |
| SU | 983088 | 12/1982 |
| WO | WO 00/68157 A1 | 11/2000 |
| WO | WO 2012/033158 A1 | 3/2012 |
| WO | 2012-053394 A1 | 4/2012 |
| WO | WO 2012/053394 A1 | 4/2012 |

OTHER PUBLICATIONS

Extended European Search Report issued in European Patent Application No. 13167209.9, dated Jul. 30, 2013.
Dec. 11, 2014 Office Action issued in Japanese Application No. 2013-101119.
Oct. 29, 2012 Chinese Office Action issued in Chinese Application No. 201220296799.X.
Jun. 11, 2013 Finnish Office Action issued in Finnish Patent Application No. 20125510.
Jun. 11, 2013 Finnish Search Report issued in Finnish Patent Application No. 20125510.
Office Action issued in Russian Patent Application No. 2013121812 dated May 13, 2013 (with partial translation).
Aug. 6, 2015 Office Action issued in Japanese Application No. 2013-101119.

\* cited by examiner

SEALING APPARATUS HAVING A PLURALITY OF SEALING ELEMENTS ARRANGED AROUND A CENTER OPENING INTO A RING CONFIGURATION

BACKGROUND OF THE INVENTION

Field of the Invention

This invention relates to an apparatus with a sealing. In the following, the invention will by way of example be explained by referring to an apparatus for heating a glass preform which is used for drawing an optical fiber, though it should be observed that the invention may also be utilized for other purposes.

Description of Prior Art

Previously a furnace is known for heating a glass preform such that the glass preform may be drawn into an optical fiber. This known furnace comprises a vertical center hole with surrounding heating elements. The glass preform is fed into this furnace from above, and while the glass preform is heated, an optical fiber may be drawn from a softened lower end of the glass preform.

In order to ensure that the properties of the drawn fiber are excellent, it is necessary to seal off the interior of the furnace from the surrounding environment. In the previously known furnace, a graphite ring is arranged at the top end of the furnace as a sealing. In this solution, the interior diameter of the graphite ring is dimensioned to generally correspond to the outer diameter of the glass preform, while the outer part of the graphite ring is arranged tightly along the surface of the furnace.

A drawback with the abovementioned prior art solution is that the cross-sectional shape of the glass preform is not constant. In practice, the glass preform is usually mainly circular in cross-section; however, due to practical problems during manufacture of the glass preform, the cross-sectional shape and/or the diameter may vary at some parts of the glass preform. This is problematic because in such a case the graphite ring is not able to efficiently conform to the shape of the glass preform which results in an increased gap between the glass preform and the graphite ring, or alternatively, in a situation where the surface of the glass-preform or the surface of the graphite ring may be damaged due to excessive contact forces between the surface of the glass preform and the surface of the graphite ring.

Additionally, due to the prior art sealing solution, it is not possible to simply utilize a single furnace for glass preforms of varying cross sectional dimensions. Instead, in order to avoid modifications of the furnace, a single furnace can in practice be utilized only for glass preforms with a predetermined cross-sectional dimension.

SUMMARY OF THE INVENTION

An object according to an embodiment of the present invention is to solve the abovementioned drawback and to provide an apparatus with a novel and efficient sealing. This object is achieved with an apparatus comprising a sealing with a plurality of sealing elements arranged generally in a ring configuration around a center opening, each sealing element comprising a sealing surface facing the center opening, at least one chamber for receiving sections of the sealing elements, and an inlet to a fluid source for providing the at least one chamber with fluid in order to generate an overpressure acting on the sections of the sealing elements received in the at least one chamber, and for pressing and moving the sealing surfaces of the sealing elements towards the center opening.

A sealing with a plurality of sealing elements arranged generally in a ring configuration around a center opening, and with sections received in an "over-pressurized" chamber, makes it possible to obtain a solution where efficient sealing is obtained. In such a solution, the overpressure in the chamber can move the sealing elements towards the center opening such that the sealing elements are always in an optimal position.

Preferred embodiments of the invention are disclosed in the dependent claims.

BRIEF DESCRIPTION OF DRAWINGS

In the following, the present invention will be described in closer detail by way of example and with reference to the attached drawings, in which.

DESCRIPTION OF AT LEAST ONE EMBODIMENT

Figure 1:
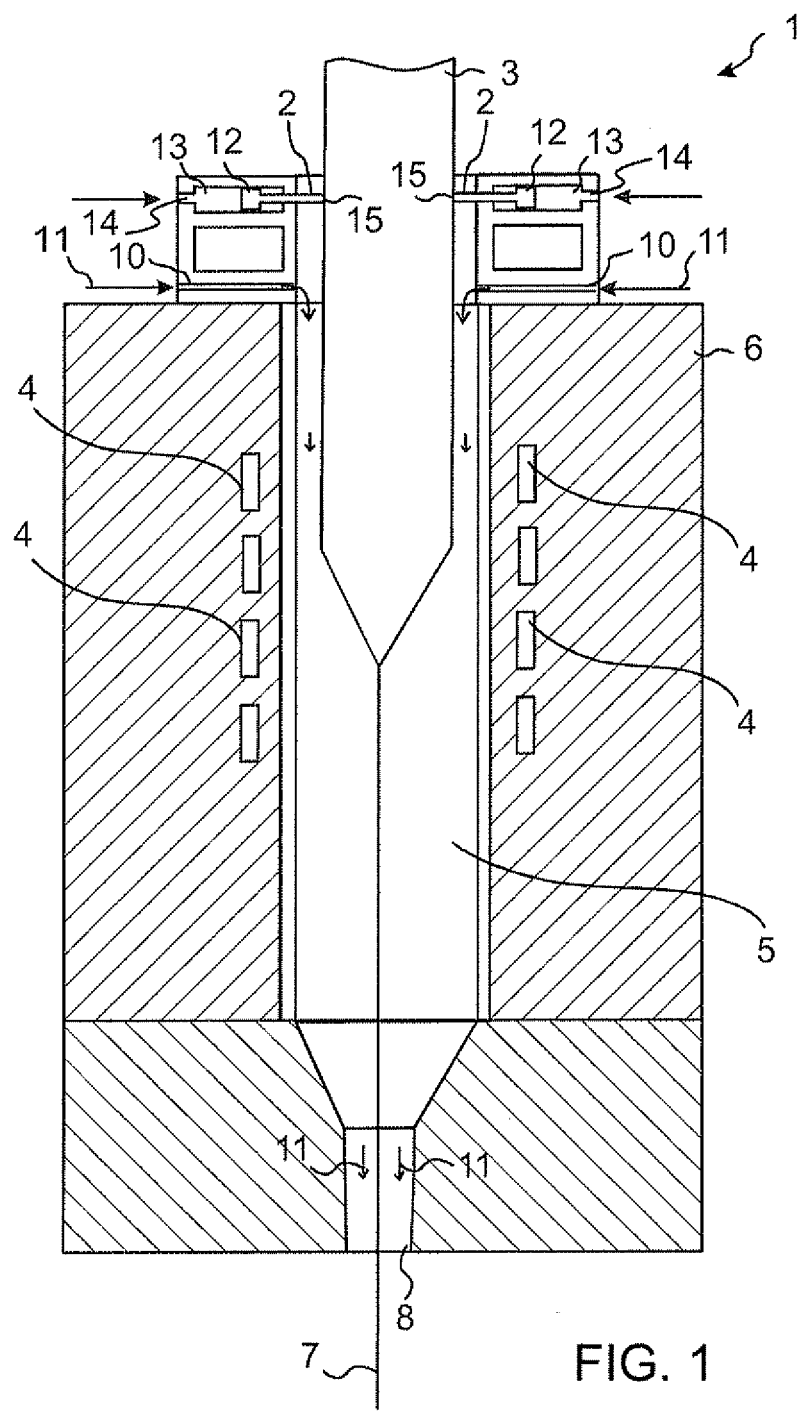
FIG. 1 illustrates a first embodiment of an apparatus.

FIG. 1 illustrates a first embodiment of an apparatus 1. The apparatus comprises a plurality of sealing elements 2 arranged generally in a ring configuration around a center opening. In the embodiment of FIG. 1, an elongated object 3, such as a generally cylindrical object of glass, protrudes into the center opening. The elongated object may be a glass preform which is heated by heating elements 4 arranged around a vertical center hole 5. In such a furnace 6 for heating a glass preform, the glass preform is heated until an optical fiber 7 can be drawn from the lower end of the glass preform.

In order to ensure that the properties of the optical fiber 7 are excellent, it is necessary to ensure that the interior of the furnace 6 is sealed off from the surroundings during drawing of the optical fiber 7. The lower opening 8 of the furnace is sealed off from the surroundings by utilizing an inert gas. In this example, the inert gas 11 is fed into the furnace via gas inlets 10 arranged at various locations of the apparatus 1. Due to the sealing elements 2, most of the introduced inert gas 11 will flow downwards such that air, for instance, located in the surroundings of the furnace 6 is prevented from flowing into the furnace via the lower opening 8 owing to the inert gas 11 flowing out of the furnace via this lower opening 8. Alternatively, it is also possible to have a flow upwards through the center hole of the furnace. In that case one alternative is to introduce the inert gas into the center hole at a position much lower than illustrated in FIG. 1. In that case the gas inlet in the upper part of the furnace is not absolutely necessary.

The sealing elements 2 are shaped as elongated plates with a section 12 protruding into a chamber 13. At least sealing surfaces 15 of the sealing elements 2 may be manufactured of glass or graphite, for instance. Depending on the implementation, each sealing element may have a chamber of its own, or alternatively, sections 12 of more than one sealing element 2 may protrude into a single chamber 13. A fluid is introduced into the chamber 13 or chambers via an inlet 14. One alternative is to utilize the same inert gas as that introduced via other inlets 10 into the interior of the furnace 6. In any case, the fluid introduced into the chamber 13 or chambers generates an overpressure in the chamber or chambers. Therefore the pressure acting on the sections 12 of the sealing elements 2 in the chambers 13 is higher than the pressure at the center opening around which the sealing elements 2 are arranged. Consequently, the overpressure presses and moves the sealing elements 2 towards the center opening such that in the example of FIG. 1, the sealing surface 15 of each sealing element 2 comes into contact with the elongated object 3, in other words the glass preform.

The use of a plurality of sealing elements 2 which can be separately moved makes it possible to obtain efficient sealing around the object 3, as each sealing element may be moved separately from the other sealing elements into an exactly optimal position. Therefore efficient sealing is achieved along the entire outer surface of the object. If, for some reason, the object does not have a perfectly circular cross section, for instance, this does not influence the sealing efficiency. In addition, possible variations in the diameter can also be compensated for, as in the case of an object with a smaller or larger diameter, when the sealing elements are allowed to move independently of each other to an optimal position. Adjustment of the fluid pressure can be utilized to increase or decrease the overpressure in the chambers 13 such that the force by which the sealing surfaces 15 of the sealing elements is pressed against the outer surface of the object 3 can be adjusted. By such an adjustment, a suitable contact force between the sealing elements 2 and the object can be achieved, which ensures that the surface of the object is not damaged by the sealing elements.

Figure 2:
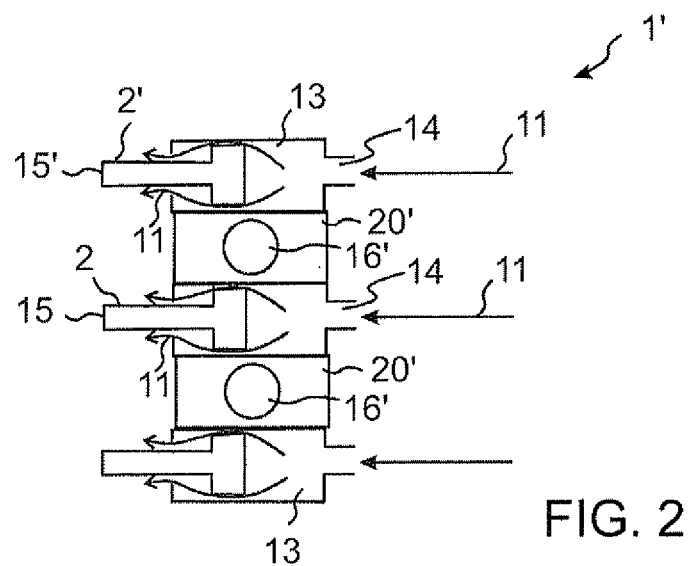
FIG. 2 illustrates a second embodiment of an apparatus.

FIG. 2 illustrates a second embodiment of an apparatus 1'. The apparatus of FIG. 2 is very similar to the one explained in connection with FIG. 1, and therefore the embodiment of FIG. 2 will be mainly explained by referring to the differences between these embodiments.

In FIG. 2, a plurality of sealing elements 2 and 2' are arranged in more than two layers. In practice, the number of layers in FIG. 2 is three. Each layer has sealing elements 2 and 2' and chambers 13, as has been explained in connection with FIG. 1. However, in FIG. 2, cooling elements are arranged between the sealing elements 2 and 2' of the different layers. Each cooling element 20' may consist of a circular ring, for instance, wherein a flow channel 16' is arranged. A cooling fluid may be passed through the flow channels 16' in order to provide adequate cooling for the apparatus 1'.

In order to obtain efficient sealing, the sealing elements 2 and 2' of the different layers may have sealing surfaces with a different radius on the curvature. For instance, the uppermost sealing element 2' of the first layer may have a curved concave sealing surface 15' with a radius R1, and the sealing element 2 of the second layer may have a curved concave sealing surface 15 with a radius R2, which may be slightly larger or smaller than R1. In such a case, if an object with a radius R1 is arranged in the center opening around which the sealing elements 2 and 2' are arranged, a perfect sealing is obtained with the sealing elements 2' of the first layer, because the radius of the curvature on their sealing edges 15' matches the radius of the object. A slightly less perfect sealing is obtained with the sealing elements 2 of the second layer, because their radius R2 does not exactly match the radius of the object. However, the situation is opposite if another object with a radius R2 is placed in the center opening, because then a perfect sealing is obtained with the sealing elements 2 of the second layer, while a slightly less perfect sealing is obtained with the sealing elements 2' of the first layer. The use of a different radius on the curvature of the sealing surfaces of sealing elements in different layers therefore makes it possible to better adapt to objects of different dimensions. Generally, it is usually advantageous to select a radius for the curvature of the concave sealing surfaces which is slightly larger than the largest possible radius of the object.

FIG. 2 also illustrates that a portion of the fluid, in this case inert gas 11, which is introduced into the chambers 13 is allowed to leak along the sealing elements towards the center opening of the ring configuration into which the sealing elements 2' and 2 are arranged. This is advantageous if the apparatus 1' is utilized for sealing a furnace 6 as illustrated in FIG. 1, for instance, and therefore a situation where air enters the furnace is to be avoided. In such a case, problems possibly caused by the fact that the sealing elements 2 and 2' are not capable of providing a sufficiently air-tight sealing can be avoided, as the introduction of inert gas at the sealing elements 2 and 2' prevents air from passing by the sealing elements into the interior of the furnace 6. Consequently, the inert gas flowing out of the furnace 6 via the opening at the top prevents air from flowing into the furnace.

Figure 3:
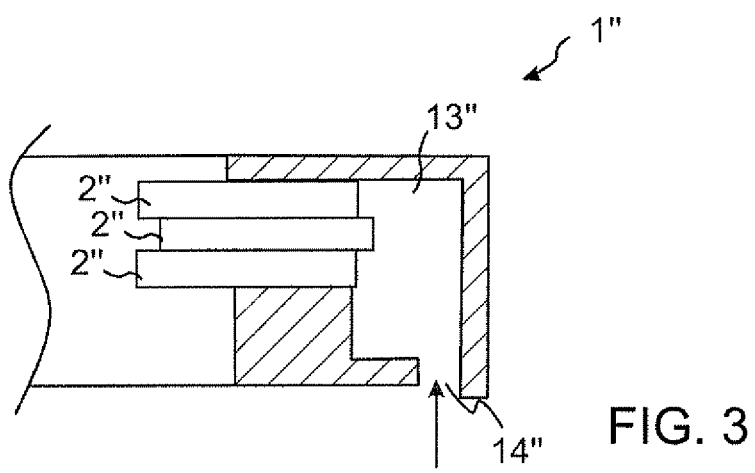
FIG. 3 illustrates a third embodiment of an apparatus.

FIG. 3 illustrates a third embodiment of an apparatus 1". The apparatus of FIG. 3 is very similar to the one explained in connection with FIGS. 1 and 2, and therefore the embodiment of FIG. 2 will be mainly explained by referring to the differences between these embodiments.

In FIG. 3, a plurality of sealing elements 2" is arranged on top of each other. Each sealing element 2" may freely move independently of the movement of the other sealing elements such that its sealing surface, owing to the fluid pressure acting on the sealing elements via the inlet 14" and chamber 13", moves towards the center opening around which the sealing elements are arranged in a ring configuration.

Figure 4:
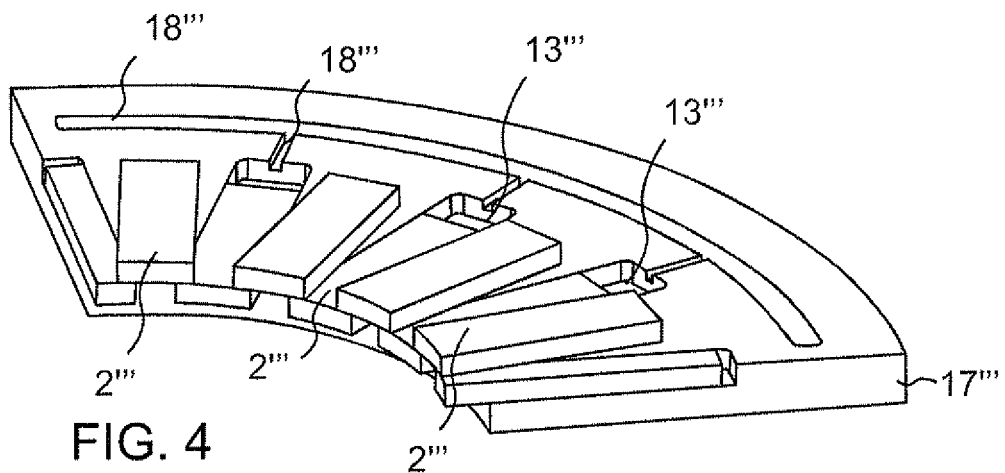
FIGS. 4 and 5 illustrate a fourth embodiment of an apparatus.
Figure 5:
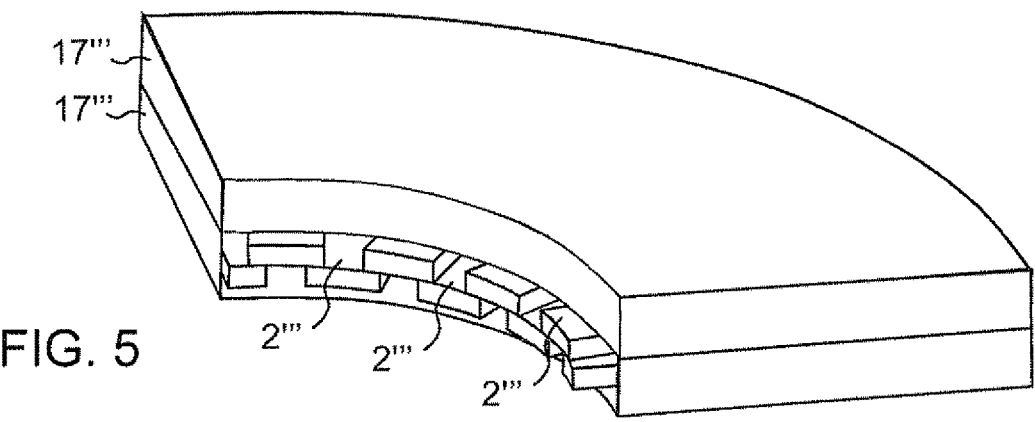

FIGS. 4 and 5 illustrate a fourth embodiment of an apparatus 1'''. In this embodiment, two annular ring-shaped plates 17''' are arranged on top of each other, as illustrated in FIG. 5. For sake of simplicity, only one quarter of the circular ring-shaped plates 17''' are shown in the figures. A plurality of sealing elements 2''' are arranged between the plates 17'''. Chambers 13''' for receiving sections of the sealing elements 2''' and channels 18''' for passing fluid to the chambers 13''' are provided in the inner surfaces of both plates 17''', as can be seen in FIG. 4 where the upper plate 17''' is removed.

In the embodiment of FIGS. 4 and 5, the sealing elements 2''' are arranged in two layers on top of each other and such that the sealing elements 2''' of the upper layer partially overlap at least two sealing elements 2''' of the lower layer. This reduces the gaps between the sealing elements and therefore a possible leakage at the boundaries between the sealing elements 2'''.

Figure 6:
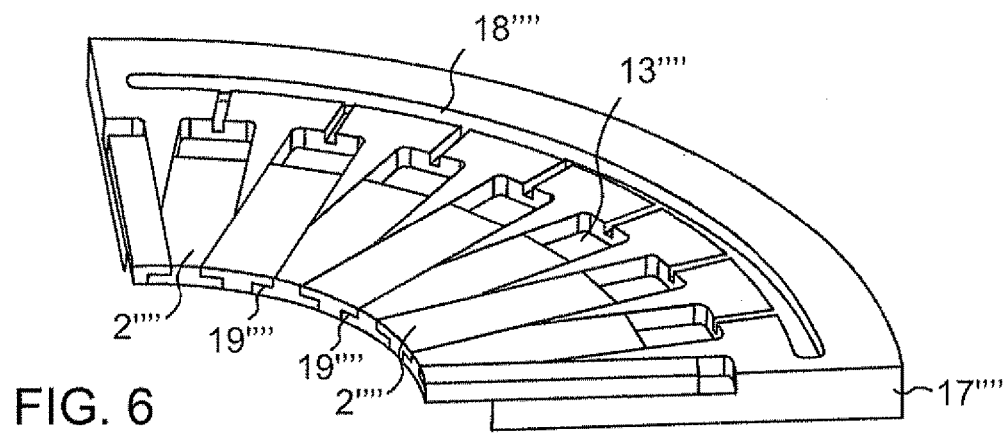
FIG. 6 illustrates a fifth embodiment of an apparatus.

FIG. 6 illustrates a fifth embodiment of an apparatus. Similarly as in the embodiment of FIGS. 4 and 5, a circular ring-shaped plate 17'''' (only a quarter of the plate is illustrated) is provided in which chambers 13'''' and channels 18'''' have been shaped. However, in the embodiment of FIG. 6, the sealing elements 2'''' have edges 19'''' that are shaped to partially overlap each other. This stepwise shaping of the edges 19'''' of adjacent sealing elements 2'''' enables an improved tightness to be obtained in a solution involving sealing elements 2'''' in only one layer. Therefore, no chambers, channels or sealing elements are needed in a counterpart plate that is arranged on top of the plate 17'''' illustrated in FIG. 6. However, it is naturally possible to utilize another plate 17''' which is identical to the one show in FIG. 6 on top of the plate 17'''', in which case this other plate comprises chambers, sealing elements and channels arranged in a manner similar to that used in connection with the plate 17''' illustrated in FIG. 6.

Figure 7:
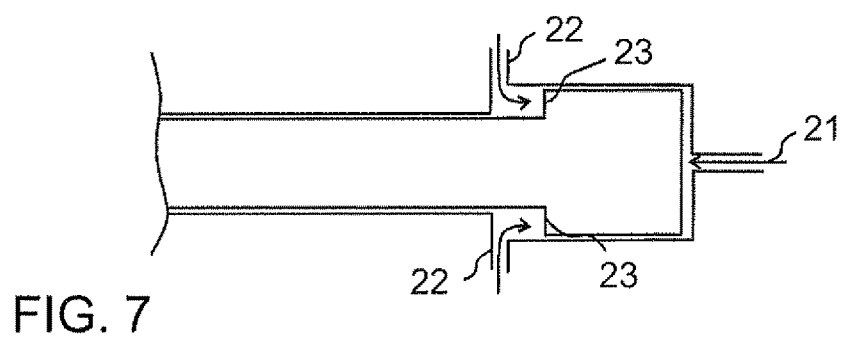
FIG. 7 illustrates a sixth embodiment of an apparatus.

FIG. 7 illustrates a sixth embodiment of an apparatus. The apparatus according to FIG. 7 is very similar to the previously explained embodiments, and therefore, the embodiment of FIG. 7 will be mainly explained by pointing out the differences as compared to the other embodiments.

FIG. 7 illustrates only a sealing element arranged in a chamber. As in the previous embodiments, an overpressure is generated in the chamber by introducing fluid to the chamber via an inlet 21. This fluid pressure will press and move the sealing elements towards the center opening, in other words to the left in FIG. 7.

Additionally, the embodiment of FIG. 7 comprises a device 22 for pressing and moving the sealing element away from the center opening. In the illustrated example the device 22 includes a pipe or pipes providing a fluid into the chamber via a side inlet or side inlets located at a distance from the inlet 21. At this location a shoulder 23 has been made. The pressure of the fluid introduced via the device 22 therefore acts against the shoulder 23 and attempts to press and move the sealing element to the right in FIG. 7, in other words, away from the center opening. Such an embodiment makes it possible to adjust the force by which the sealing element is pressed towards an object arranged in the center opening. In the illustrated example it is sufficient to adjust the fluid pressures via inlet 21 and device 22 in relation to each other such that a suitable force is obtained. Such adjustment may be carried out by a control unit and valves, for instance. Additionally, once the fluid pressure at the inlet 21 is cut off totally, the fluid pressure acting on the shoulder 23 will push each sealing element to their starting position, in other words as much to the right in FIG. 7 as possible.

In the above example it has been assumed that the device 22 is a pipe introducing fluid into the chamber. However, instead another type of device 22 may be employed, such as a resilient element or a spring, for instance.

It is to be understood that the above description and the accompanying figures are only intended to illustrate the present invention. It will be obvious to a person skilled in the art that the invention can be varied and modified without departing from the scope of the invention.

The invention claimed is:
1. An apparatus comprising
   a furnace for heating a glass preform, the furnace comprising a vertical center hole with surrounding heating elements,
   a sealing arranged on top of the furnace for sealing off the interior of the furnace from the surrounding environment, wherein a plurality of sealing elements are arranged around a center opening into a ring configuration, each sealing element comprising a sealing surface facing the center opening,
   at least one chamber for receiving sections of the sealing elements, and
   an inlet to a fluid source for introducing fluid into the at least one chamber in order to generate an overpressure acting on the sections of the sealing elements received in the at least one chamber and which moves the sealing surfaces of the sealing elements towards the center opening.
2. The apparatus according to claim 1, wherein the sealing elements have a curved concave sealing surface.
3. The apparatus according to claim 1, wherein the sealing comprises adjacent sealing elements with edges shaped to partially overlap each other.
4. The apparatus according to claim 1, wherein the sealing comprises at least two layers of sealing elements arranged on top of each other such that the sealing elements of an upper layer are arranged to partially overlap at least two sealing elements of a lower layer.
5. The apparatus according to claim 4, wherein the curvature of the sealing surfaces of sealing elements of a first layer has a different radius than the curvature of the sealing surfaces of sealing elements in a second layer.
6. The apparatus according to claim 1, wherein the sealing comprises:
   at least two layers of sealing elements, and
   a cooling element arranged between the at least two layers of sealing elements, the cooling element comprising a cooling channel for passing a cooling fluid through the cooling element.
7. The apparatus according to claim 6, wherein the curvature of the sealing surfaces of sealing elements of a first layer has a different radius than the curvature of the sealing surfaces of sealing elements in a second layer.
8. The apparatus according to claim 1, wherein the furnace is a furnace for heating a glass preform such that the glass preform may be drawn into an optical fiber.
9. The apparatus according to claim 1, wherein at least the sealing surfaces of the sealing elements are made of graphite or glass.
10. The apparatus according to claim 1, wherein
    the inlet is connected to a source of inert gas for providing the overpressure in the at least one chamber with the inert gas, and
    the at least one chamber and the section of a sealing element received by the at least one chamber are mutually dimensioned to allow the inert gas to leak from the at least one chamber along the sealing element into the center opening.
11. The apparatus according to claim 1, wherein the apparatus comprises a device for pressing and moving the sealing elements away from the center opening.
12. The apparatus according to claim 1, wherein each sealing element has its own chamber.
13. The apparatus according to claim 1, wherein more than one sealing element protrudes into a single chamber.
14. The apparatus according to claim 1, wherein each sealing element is capable of moving separately from other sealing elements.

* * * * *